March 23, 1954  W. H. HULSWIT, JR., ET AL  2,672,909
GROOVE-CRACK RESISTANT TIRE AND METHOD OF MAKING SAME
Filed April 19, 1950
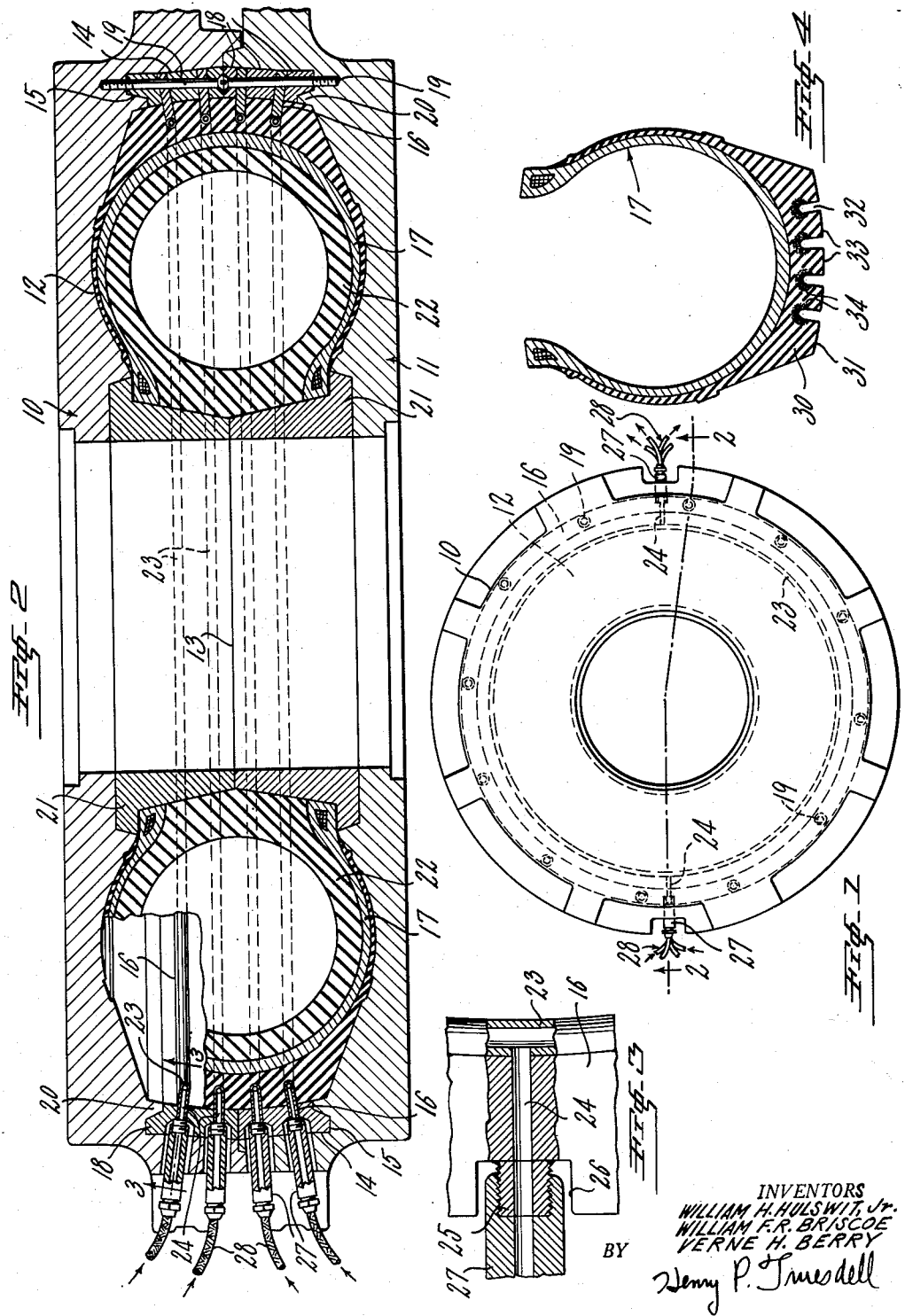
INVENTORS
WILLIAM H. HULSWIT, Jr.
WILLIAM F. R. BRISCOE
VERNE H. BERRY
BY
Henry P. Truesdell
ATTORNEY Patented Mar. 23, 1954

2,672,909

UNITED STATES PATENT OFFICE 2,672,909

GROOVE-CRACK RESISTANT TIRE AND METHOD OF MAKING SAME

William H. Hulswit, Jr., Grosse Pointe, and William F. R. Briscoe and Verne H. Berry, Detroit, Mich., assignors to United States Rubber Company, New York, N. Y., a corporation of New Jersey Application April 19, 1950, Serial No. 156,841

9 Claims. (Cl. 152—209)

This invention relates to an improved pneumatic tire and to a method of making the same. More particularly it relates to a pneumatic tire in which the rubber in the area of the bases of the tread grooves is less susceptible to cracking than in conventional tires, by reason of the fact that the improved tire is vulcanized in such a way as to leave the tread groove bases partially unvulcanized.

The tire molds disclosed herein for carrying out the method of the present invention are claimed in an application of W. F. R. Briscoe et al., Serial No. 156,842, and an application of W. H. Hulswit et al., Serial No. 156,843, now Patent No. 2,618,812, both filed of even date herewith and assigned to the same assignee as the present application.

In the past it has been a common failing of pneumatic tires that the bases of the grooves defining the anti-skid pattern of the tire tread tend to develop cracks. This groove-cracking is occasioned mainly by the fact that the rubber of the groove bases is under tension when the tire is inflated, rendering the rubber particularly susceptible to attack by ozone in the air with consequent deterioration of the rubber composition. Continual flexing of the groove bases as the tire revolves aggravates this condition. Such cracking is not only unsightly, but actually weakens the structure of the tire and may be a cause of premature failure of the tire.

A principal object of the invention is to provide an improved tire in which the groove bases are less susceptible to cracking.

Another object is the provision of a method of manufacturing tires which renders the bases of the grooves in the tire tread more resistant to damage from repeated flexing.

Still another object is to provide an improved tire in which the tread is essentially a single, integral composition, but having soft, flex-cracking resistant areas in the bases of the tread grooves, and relatively tougher, abrasion resistant areas in the road-contacting portion of the tread.

A further aim is to provide a method of equipping old or worn tires with a new tread surface embodying the foregoing improvements.

Other objects and advantages will appear hereinafter.

According to the invention, we have found that the tendency to groove cracking is greatly reduced if the tire is vulcanized in such a way as to leave the rubber composition in the area of the bases of the grooves partially unvulcanized, the remainder of the rubber composition of the tread being vulcanized to the normal extent, so that tread wear and tire strength are in no way sacrificed. The partially unvulcanized rubber composition at the bases of the grooves has been found to be far more resistant to the influences causing groove cracking than ordinary fully vulcanized rubber tread compositions, with the result that the improved tire gives more satisfactory performance in this respect than do conventional tires.

The invention will be more fully understood from the following detailed description, when read with reference to the accompanying drawing in which:

Fig. 1 is a plan view of a tire vulcanizing mold adapted to practicing the method of this invention;

Fig. 2 is a sectional view on a larger scale of the mold of Fig. 1, taken along the line 2—2 of Fig. 1, and showing a pneumatic tire containing a curing bag in place in the mold, a portion of the tire and curing bag being broken away;

Fig. 3 is an enlarged sectional view of a part of the mold taken along line 3—3 of Fig. 2; and Fig. 4 is a sectional view of the improved tire.

Referring to Figs. 1 and 2, the tire shaping and vulcanizing mold shown therein comprises an upper mold half 10 and a lower mold half 11 which together define a toroidal cavity 12 for the tire. The mold is split at a horizontal parting line 13 and may be opened for insertion and removal of the tire. The mold is adapted to be disposed within the usual enclosing chamber or press (not shown) such as a McNeil press, which is adapted to clamp the mold halves 10 and 11 firmly together during vulcanization. Suitable means are associated with such chamber or press, such as a steam jacket, for heating the mold from the outside, or the mold halves 10 and 11 may themselves contain suitable passageways (not shown) in the walls thereof for circulating a fluid heating medium.

Each mold half is provided with an annular tread block assembly 14 located at the outer periphery of the mold cavity 12. The tread block assembly 14 is disposed within a suitably shaped recess 15 in the mold half. The tread block assembly 14 includes projecting members or ribs 16 which extend into the mold cavity 12 for the purpose of impressing a suitable anti-skid pattern on the tread surface of a tire 17 in the mold cavity. Although the ribs 16 are in this case shown as straight circumferential ribs, it will be understood that projections or ribs of other suitable shapes and arrangement may be employed for the purpose of impressing the particular groove pattern desired on the tread surface of the tire 17.

The tread block assembly 14 further includes suitably shaped spacer ring members 18 interposed with the ribs 16, the whole assembly being held firmly together by spaced screws 19 passing into the parting face 13 and through transverse holes in the ribs and spacer rings, and threaded into the mold halves. An annular rim or flange 20 of the mold half intermeshes with a corresponding recess in the end of the tread block assembly 14 and aids in maintaining it securely in place.

Each mold half is also provided at its inner diameter with a toe ring member 21 which may be welded or otherwise attached to the mold half, and which is adapted to impart the desired shape to the bead region of the tire 17 in cooperation with a curing bag 22, which is an inflatable toroidal form of extensible material, somewhat similar to an inner tube, and which is inserted in the tire before it is placed in the mold cavity. The curing bag 22 is provided with the usual inlet and outlet means (not shown) for circulation of a heated fluid medium under pressure through the hollow interior thereof for the purpose of expanding the tire 17 to cause it to conform to the shape of the mold, as well as for the purpose of supplying internal heat to the tire, whereby it may be vulcanized more rapidly and more uniformly.

The end surface of each projecting tread rib 16 of the mold is provided with a tube 23 for circulation of a fluid heat controlling medium for limiting the degree of vulcanization of the tread rubber composition in the area of the tread groove bases. The tubes 23 pass circumferentially around the mold along the ribs 16 and may be attached thereto by brazing or other suitable means. Connecting holes 24 are drilled radially of the mold through the ribs 16 into the tubes 23 at diametrically opposed points, to provide for entrance and egress of the heat controlling fluid. As shown in Fig. 3, each hole 24 engages a threaded nipple 25 welded to the tread block assembly 14 within a suitable recess 26 provided in the tread block assembly for the purpose of connecting the holes 24 to a suitable coupling assembly 27 from which flexible metal hoses 28 (Figs. 1 and 2) may be extended to a suitable source (not shown) for circulating heating fluid.

In carrying out the invention, a raw pneumatic tire 17 to be vulcanized is placed within the mold cavity 12 and the mold is closed as previously indicated. It will be understood that the tire 17 may first be built up in band form on a tire building drum in the conventional manner and subsequently shaped with the aid of a curing bag 22 in the usual vacuum shaping box. All of the foregoing steps are well understood by those skilled in the art, and require no detailed description here. As far as the present invention is concerned, any suitable method may be employed for building and preliminary shaping of the tire.

In conventional practice, every effort is made to so design the heat transfer characteristics of the mold, and to so proportion the relative temperatures applied to the mold externally and internally, that the entire tire will be uniformly vulcanized to the optimum extent. Thus, it is important that no part of the tire be subjected to an excessive temperature, or be heated for too long a period, otherwise that portion might become over-cured and therefore have sub-standard physical and wearing properties. Similarly, it has heretofore been considered essential to insure that all parts of the raw tire be heated to a sufficiently high temperature for a sufficient length of time to effect a complete cure of the various rubber compositions of the tire, because partial or limited cure has been associated with undesirable physical properties, such as inferior strength and poor abrasion resistance.

In the present invention, we deliberately limit the degree of cure of the tire tread composition in the surface of the bases of the tread grooves. This may be accomplished by circulating through the tubes 23 on the ends of the projections 16 a fluid medium of lower temperature than the general mold temperature, so that the tubes 23, in effect, serve as cooling tubes. This lowers the temperature of the tread composition in the area of the groove bases during the vulcanizing operation and thereby limits the degree of vulcanization which takes place, compared to the remaining uncooled portion of the tread.

In general, we have found that for the usual vulcanizable tire tread compositions in conventional tire molds, satisfactory results are obtained when the temperature of the circulating cooling medium within the tubes 23 is approximately 20° F. below the temperature of the heating chamber which supplies external heat to the mold. Such cooling medium may be circulated during all or part of the normal curing cycle.

Upon completion of the normal curing cycle the mold is opened and the vulcanized tire is removed therefrom in the usual manner. As indicated in Fig. 4 the tire so produced has a tread portion 30 composed of a single integral vulcanized rubber composition. This composition may be any of the usual rubber compositions, whether comprised of natural rubber, or synthetic rubbers such as GR–S etc., conventionally employed for tire treads. The tread 30 has a road-contacting surface 31 which has imparted thereto an anti-skid pattern defined by circular grooves 32 and projecting anti-skid blocks 33. It will be understood that any other suitable anti-skid pattern may be impressed on the tread as desired by using a correspondingly shaped vulcanizing mold.

Areas 34 at the bases of the grooves 32 have purposely been left partially under-cured with the result that this portion of the tread composition has exceptional resistance to cracking, and withstands considerably more flexing than would be the case if it were fully cured. At the same time, the road-contacting surface 31 and the block portions 33 have attained full cure, so that these portions have the desired toughness and high abrasion resistance. Such an integral tire tread composition having selective degrees of cure, and therefore selective physical properties, in different parts thereof is believed to be unique.

The relative degree of cure of the main body of the tread 30, as compared to the groove bases 34 is readily determinable by measuring any of those physical properties which normally vary with the degree of cure. Thus, for example, if the elongation-at-break is determined on samples of the rubber removed from the tire tread made according to the method of this invention it is found that the groove base areas display greater elongation-at-break than the road-contacting areas. Usually, satisfactory performance with respect to groove cracking is obtained when the elongation-at-break of the rubber of the groove bases is from 1.05 to 1.25 times and preferably about 1.12 times the elongation-at-break of the rubber in the road-contacting surfaces, the exact value in any given case depending on such variables as the nature of the particular rubber tread composition employed, the service for which the tire is intended, etc. The preferred relative elongation-at-break value of 1.12, and other tests, indicate that in the preferred practice of the invention the rubber of the groove bases receives about 50% of full cure, as represented by the cure of the road-contacting surface. Generally, for purposes of the invention, the relative state of cure of the groove bases is preferably within the range of from 20% to 80% of the optimum cure in the road-contacting surface. The actual value of the elongation-at-break for the fully vulcanized portions of the tread will in general be the same as in conventional tires, usually within the range of from 450% to 650% elongation depending on the particular composition employed.

In any case, the rubber of the groove bases should not be left under-cured to such an extent that they lack strength and have poor appearance, or tend to be tacky and to retain dirt and stones picked up from the road.

The desired relative degree of cure is usually obtainable, as indicated previously, by circulating water or other fluid medium in the groove base tubes of the mold at a temperature of approximately 20° F. less (usually 15° to 30° less) than the steam temperature in the chamber enclosing the mold. This is based on results obtained with standard tire tread compositions in a McNeil type mold wherein the steam jacket temperature is usually of the order 250° to 310° F. However, the temperature differential between the heating medium in the groove base tubes and in the remainder of the mold will vary in any given case, depending on such variables as the nature of the tread composition, the design of the mold and of the enclosing chamber, the external and internal temperatures applied to the tire, the time cycle of vulcanization, the velocity of the circulating fluid in the groove base tubes, etc. In practice, an average effective temperature differential of from 5° to 40° F. between the groove bases and the temperature of the remainder of the tread will be found to cover the majority of cases, and to result in a tire tread in which the relative degrees of cure of the groove bases and the road-contacting portions are as desired.

The method of this invention contemplates attainment of the desired differential cure by effecting an average temperature differential during the curing cycle by any suitable means, such as by circulating a cooling medium in the area of the bases of the grooves, or by limiting the transfer of heat from the tire mold to the groove bases, as by making the groove projections of the tire mold of a relatively non-conducting material, such as a thermosetting plastic composition reinforced with insulating glass fibers.

In general, the vulcanizing conditions applied to the carcass portions, the sidewall portions and to the bulk of the tread portion in the present invention are the same as in conventional practice. Thus, the temperature of vulcanization is usually within the range of from 250° to 330° F., and the time of vulcanization is usually within the range of from 20 to 580 minutes.

The following example illustrates the invention in more detail.

A pneumatic tire was built up in the usual manner using a conventional, abrasion-resisting rubber composition of the following character for the tread portion thereof:

| | Parts by weight |
|---|---|
| Smoked sheet (Natural rubber) | 100.0 |
| Stearic acid | 3.0 |
| Pine tar | 2.0 |
| Zinc oxide | 3.0 |
| MPC Black | 43.0 |
| Sulfur | 3.0 |
| Mercaptobenzothiazole | 0.6 |
| Phenyl-beta-naphthylamine | 1.0 |

The side wall portions of the tire were composed of a conventional, relatively soft rubber composition, and the carcass of the tire was composed of the usual rubber and cord laminates containing inextensible bead elements in the rim portions.

The raw tire containing a curing bag was placed in a mold as shown in Fig. 2. The external jacket surrounding the mold was heated with steam at 281° F. for about 75 minutes. During this time hot water was circulated through the curing bag at a temperature of 310° F. At the same time hot water at 261° F. was circulated through the groove tubes.

After removal of the tire from the mold the relative degrees of cure of the groove bases and the road contacting surfaces of the tread were determined by removing samples of the rubber and performing various tests thereon, viz., by determining the elongation-at-break, the percentage of free sulfur, the swelling index, and the T-50 value. The relative cure at the groove bases as indicated by the tests was approximately ½ that of the road-contacting surfaces.

Tires made in this manner were placed on a test wheel and run at a speed of 45 miles per hour under conditions simulating heavy loading of the tire for about 179 hours. For comparison, tires made in the conventional manner were similarly tested. During the test, the conventional tire developed extensive cracks in the groove bases, while the tire of this invention, under similar conditions, developed only minor cracks. The relative degree of cracking may be quantitatively expressed as the percentage of cracked area, based on the total under-skid area. The total under-skid area of any groove is represented by the product of the circumferential length of the groove times the depth of the rubber at the base of the groove. The cracked area is the product of the length of the crack times the depth of the crack. Expressed in this way, the percentage cracking of the conventional tire tested above was 41.66%, while the percentage cracking of the tire of this invention was only 0.24%.

While the invention has been described with particular reference to manufacture of a new tire, it will be understood that old or worn tires may be provided with an improved tread using the method of this invention. This may be accomplished by retreading the tire in the usual manner with a strip of vulcanizable rubber tread composition, but using a retreading mold in which means, such as cooling tubes, are employed for applying relatively milder vulcanizing conditions to the groove bases so that the resulting tread has the desired improved, crack-resisting, partially-cured areas in the surfaces of the grooves.

From the foregoing, it is seen that our invention provides a convenient and economical method of producing an improved tire which is less susceptible to groove cracking than conventional tires.

Because the rubber of the groove surfaces is only partially cured, its modulus is relatively low, and therefore the stresses therein resulting from inflation and flexing are relatively low. Hence, the surface is less susceptible to fatigue failure from continually reversing applied stresses.

The under-cured stock in the groove surfaces has much more resistance to ozone than does fully cured stock, thereby imparting protection from ozone at the very point where ozone attack is normally most damaging.

Because the stock in the groove bases is under-cured, it contains a small amount of free sulfur which was not consumed in the vulcanizing operation. This free sulfur is considered helpful in retarding chemical deterioration of the rubber, such as oxidative attack.

Further, the cut growth resistance of the under-cured portion of the tread is greatly enhanced, and such portions are also less liable to be damaged by bruising, or to become torn. At the same time, the road-contacting surfaces and projecting anti-skid blocks of the improved tire tread have received full cure, so that maximum abrasion resistance is attained and tread wear is minimized.

A particularly advantageous feature of the invention is that while selective physical properties have been imparted to the tread in selective areas, the tread is still an integral unitary structure of essentially a single rubber composition. That is, the desired selectively placed physical property have been obtained without resorting to laminating procedures, or without restoring to employment of a plurality of tread stocks of different character, etc. Therefore, there are no laminates or separate stocks in the surface of the tread which it might be difficult to adhere together properly or which might tend to come apart in use. This feature also simplifies the manufacture of the improved tread.

Having thus described our invention, what we claim and desire to protect by Letters Patent is:

1. A vulcanized rubber tire having a unitary integral road-contacting tread portion made of a single rubber composition, said tread having empty grooves of substantial depth in the surface thereof, the rubber in the bases of said grooves being incompletely vulcanized whereby it is highly resistant to cracking.

2. In a pneumatic tire, a tread portion of a single, integral vulcanized rubber composition constituting the road-contacting surface of the tire, and an anti-skid configuration in the said tread portion defined by empty grooves extending substantially into the surface of said tread, the rubber composition in the bases of said grooves being relatively less vulcanized than the remainder of said tread portion, whereby the bases of the grooves are highly resistant to cracking.

3. In a pneumatic tire, a unitary integral tread portion composed of a single rubber composition, having empty grooves of substantial depth therein, the bases of the grooves being only partially vulcanized to impart improved ozone-resistance thereto, and the remainder of the tread being fully vulcanized for optimum abrasion resistance.

4. A vulcanized rubber tire having a unitary integral tread portion composed of a single rubber composition, said tread having empty grooves of substantial depth in the surface thereof, the rubber in the bases of said grooves being incompletely vulcanized to the extent that its elongation-at-break is from 1.05 to 1.25 times the elongation-at-break of the rubber in the outer tire tread, which is completely vulcanized.

5. In a pneumatic tire, a unitary integral tread portion composed of a single rubber composition, having empty grooves of substantial depth therein, the elongation-at-break of the rubber in the bases of the grooves being from 1.05 to 1.25 times the elongation-at-break of the rubber in the remaining surface of the tread, whereby the tire is highly resistant to groove-cracking but has good abrasion resistance.

6. In a method of making a vulcanized rubber tire having grooves therein, the step of vulcanizing the rubber in the bases of said grooves only partially, and completely vulcanizing the remaining surface of the tire, whereby the grooves are rendered crack-resistant.

7. In a method of making a pneumatic tire having a tread portion of rubber composition and an anti-skid configuration in the said tread portion defined by grooves extending into the surface of said tread, the step of vulcanizing the rubber composition in the area of the bases of said grooves only partially, while completely vulcanizing the remainder of the tread.

8. A method of vulcanizing a pneumatic tire having a tread portion of rubber composition and an anti-skid configuration in the said tread portion defined by grooves extending into the surface of said tread, including the step of heating the tire to vulcanizing temperatures, the average effective temperature applied to the bases of the said grooves being from 5° to 40° F. less than the temperature applied to the remaining surface of the tread, said heating being continued until the said remaining surface of the tread is substantially completely vulcanized, the bases of the tread grooves being relatively less vulcanized because of the lower temperature applied thereto, whereby the tire is rendered groove-crack resistant.

9. A method as in claim 8 in which the said average effective temperature applied to the bases of the said grooves is of the order of 20° F. less than the temperature applied to the remaining surface of the tread.

WILLIAM H. HULSWIT, JR.
WILLIAM F. R. BRISCOE.
VERNE H. BERRY.

References Cited in the file of this patent

UNITED STATES PATENTS

| Number | Name | Date |
|---|---|---|
| 1,361,970 | Dickey | Dec. 14, 1920 |
| 1,806,846 | Fox et al. | May 26, 1931 |
| 1,939,878 | Davidson | Dec. 19, 1933 |
| 2,110,224 | Havens | Mar. 8, 1938 |
| 2,207,098 | Maynard | July 9, 1940 |
| 2,221,642 | Kraft | Nov. 12, 1940 |
| 2,476,146 | Hawkinson | July 12, 1949 |

FOREIGN PATENTS

| Number | Country | Date |
|---|---|---|
| 506,142 | Great Britain | May 23, 1939 |